United States Patent
Cohen

[11] 3,828,276
[45] Aug. 6, 1974

[54] HIGH EFFICIENCY ACOUSTO-OPTICAL Q-SWITCH

[75] Inventor: Martin G. Cohen, Huntington, N.Y.

[73] Assignee: Quantronix Corporation, Smithtown, N.Y.

[22] Filed: May 25, 1973

[21] Appl. No.: 363,994

[52] U.S. Cl. .............................. 331/94.5 Q, 350/161
[51] Int. Cl. ............................................... H01s 3/11
[58] Field of Search ........... 331/94.5; 350/160, 161, 350/147, 150, 157

[56] References Cited
UNITED STATES PATENTS
| | | | |
|---|---|---|---|
| 3,297,876 | 1/1967 | DeMaria | 331/94.5 |
| 3,613,024 | 10/1971 | Geusic | 331/94.5 |

*Primary Examiner*—William L. Sikes
*Attorney, Agent, or Firm*—Darby & Darby

[57] ABSTRACT

In a solid state, Q-switched laser oscillator of the type in which the laser medium emits unpolarized light and the acousto-optical Q-switch exhibits strong optical polarization dependence, a first quarter-wave plate disposed within the optical cavity between the Q-switch and one cavity mirror for causing the polarization components of the light beam resolved along the fast and slow axes of the quarter-wave plate to rotate 90° between successive passages through the Q-switch so that the light which was less strongly scattered during one passage through the Q-switch is more strongly scattered during the next passage through the Q-switch, and a second quarter-wave plate disposed within the optical cavity on the other side of the Q-switch for nullifying the effect of the first quarter-wave plate when the Q-switch is turned off so as to leave the polarization components of the laser oscillation unperturbed.

This invention relates to laser Q-switches, and, more particularly, to acousto-optical Q-switches for solid state laser media of the type which inherently produce unpolarized light.

8 Claims, 1 Drawing Figure

PATENTED AUG 6 1974 3,828,276
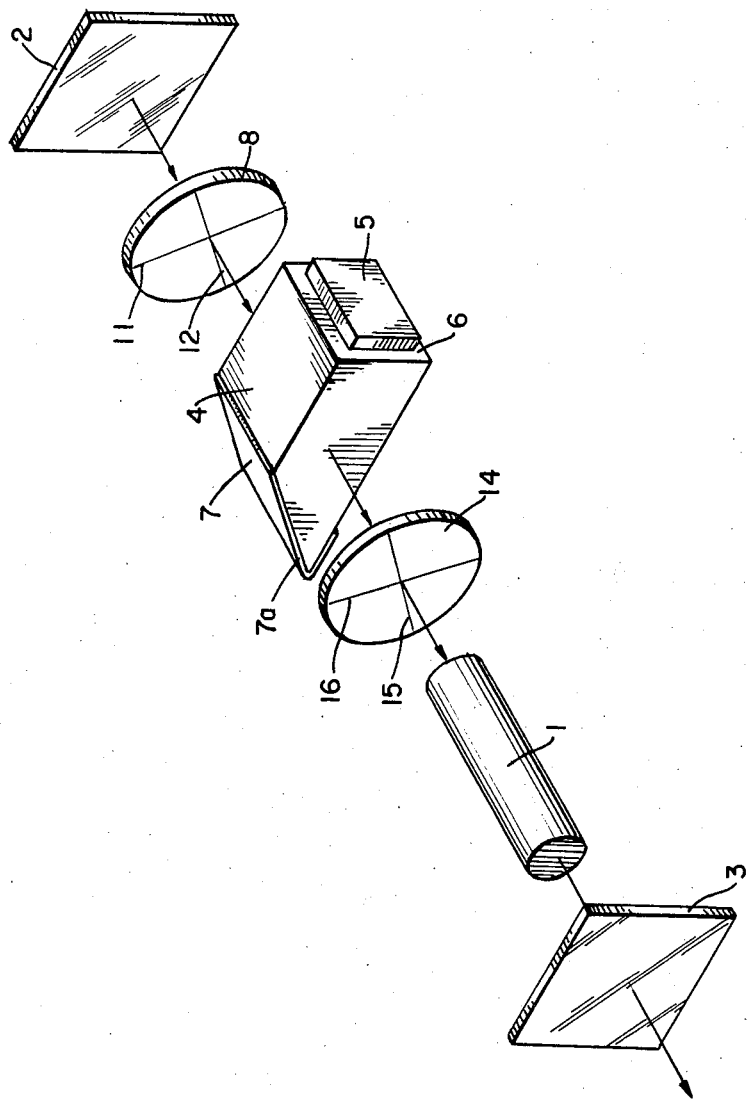

HIGH EFFICIENCY ACOUSTO-OPTICAL Q-SWITCH

BACKGROUND OF THE INVENTION

Certain types of solid state lasers have been found to be useful as cutting or scribing tools. For example, the continuous-wave solid state laser such as the Neodymium-doped Yttrium Aluminum Garnet (Nd:YAG) laser has been found to be useful in materials working applications such as the scribing of silicon and ceramics, the trimming of electrical resistors and the etching of micro-circuits. The successful performance of this solid state laser is due in substantial measure to the effectiveness and reliability of the solid state acousto-optical Q-switch which is almost exclusively used in it.

Basically, an acousto-optical Q-switch is a block of transparent photoelastic material, such as fused quartz, with an ultrasonic transducer bonded to one face, and a radio frequency (r.f.) power source for driving the ultrasonic transducer to generate a beam of acoustic waves in the photoelastic block. The interaction of the light beam emitted by the laser medium with the acoustic waves in the photoelastic block results in Bragg-effect scattering of the light beam thus spoiling the resonant quality (Q) of the optical cavity. When the ultrasonic beam is turned off, the Q of the optical cavity is restored and laser oscillations build up, resulting in a high peak power laser output pulse.

In the early acousto-optical Q-switches, it was found that about 10 watts of r.f. power were sufficient to overcome a single-pass laser gain of about 10 percent. However, the subsequent improvement of the single-pass laser gain through the use of longer, higher-quality laser rods and krypton-arc pumping has forced the use of much higher r.f. drive powers, sometimes in excess of 50 watts, in a usually futile attempts to produce the increased optical loss necessary to drive the laser below the threshold of oscillation.

This brute force approach can cause excessive heating which can result in failure of the bond between the transducer and the photoelastic block. Efforts to overcome this problem by cooling the Q-switch have not been entirely satisfactory because of the cumbersomeness of the cooling systems and because cooling can produce thermal gradients in the photoelastic material which can distort the optical path.

One of the problems of conventional, longitudinal-mode, acousto-optical Q-switches is that, in certain commonly used photoelastic materials, such as for example fused quartz, the photoelastic coefficient for light polarized parallel to the direction of propagation of the ultrasonic beam is substantially less than the photoelastic coefficient for light polarized perpendicular to the direction of propagation of the ultrasonic beam. As a result, light polarized parallel to the ultrasonic beam direction is less intensely scattered than light polarized perpendicular to the ultrasonic beam direction. For example, in fused quartz, the ratio of these scattering intensities is 1:5.

Because a laser will always choose to oscillate in the polarization that experiences the minimum loss, the laser will avoid the high loss polarization when the ultrasonic beam is turned on, thus reducing the effectiveness of the Q-switch. While an intracavity Brewster plate could be used to polarize the light beam in the high-loss direction, a Brewster plate would introduce unacceptable laser power loss and mode distortion for all laser modes above $TEM_{oo}$ as a result of thermal stress birefringence induced in the laser rod.

It is therefore an object of this invention to provide an improved acoustic-optical Q-switch.

More particularly, it is an object of this invention to provide a Q-switch which makes effective use of the high-loss polarization direction of the acousto-optical interaction.

It is also an object of this invention to provide an acousto-optical Q-switch that does not affect laser performance when the acoustic beam is not present.

In accordance with the above and other objects, the present invention provides an acousto-optical Q-switch including a pair of quarter-wave plates mounted in the laser cavity on either side of the photoelastic block, the fast axis of one quarter-wave plate and the slow axis of the other quarter-wave plate being oriented at 45° to the direction of propagation of the ultrasonic beam within the photoelastic block. Light emerging from the photoelastic block passes through one of the quarter-wave plates, is reflected from the mirror forming one end of the optical cavity and passes through the quarter-wave plate again before reentering the photoelastic block. This serves to rotate the polarization components of the light beam resolved along the fast and slow axes of the quarter-wave plate by 90° so that on the return trip through the photoelastic block, the high- and low-loss polarizations are reversed so that the polarization component which was less strongly scattered by the first interaction with the ultrasonic beam, is more strongly scattered by the second interaction with the ultrasonic beam and vice versa.

Because the 90° polarization rotation would adversely affect the laser oscillation when the ultrasonic beam is not present, the second quarter-wave plate is provided with its fast and slow axes oriented along the slow and fast axes, respectively, of the first quarter-wave plate. The result is to nullify the effect of the first quarter-wave plate when the ultrasonic beam is not present, thus leaving the polarization components of the laser oscillation unperturbed.

In the case of a longitudinal mode Q-switch using fused quartz as the photoelastic material, because the single-pass loss for light polarized perpendicular to the direction of propagation of the acoustic beam is about five times the single-pass loss for light polarized parallel to the acoustic beam, the overall loss produced by the improved acousto-optical Q-switch of the present invention for all polarizations is approximately three times the loss that would be produced by a conventional acousto-optical Q-switch with the laser oscillating in the low-loss polarization.

Other objects and advantages of the present invention will be apparent from the following detailed description and accompanying drawing which set forth, by way of example, the principle of the present invention and the best mode contemplated for carrying out that principle.

The drawing shows an explosed perspective view of a laser oscillator including the improved acousto-optical Q-switch of the present invention.

Referring in detail to the drawing, the laser rod 1 is disposed within an optical resonant cavity formed by high-reflectivity mirror 2 and transmission mirror 3. The laser medium 1 is preferably of a type that emits unpolarized light, that is, light that does not have a preferential direction of polarization. Examples of solid state laser media which emit unpolarized light are Neodymium-doped Yttrium Aluminum Garnet (Nd:YAG) Neodymium-doped glass (Nd:glass) and Neodymium-doped calcium lanthanum silicate oxyapatite ($Nd:CaLa_4(S_iO_4)_3O$).

The mirrors 2 and 3 which form the optical cavity for the laser oscillator may be of the conventional type well-known to those skilled in the art. While flat mirrors are shown in the drawing, it will be appreciated that confocal mirrors, roof prisms, corner cubes or other types of reflectors used to form resonant optical cavities for lasers may be used within the spirit and scope of the present invention.

A block of transparent photoelastic material 4 is mounted in the resonant cavity between the laser rod 1 and the high-reflectivity mirror 2. In the preferred form of the present invention, the block of photoelastic material 4 is made of fused quartz which has several advantages as an acousto-optical interaction medium including excellent optical and acoustic properties, resistance to optical damage and ease of fabrication. It will be appreciated, however, that any transparent, optically isotropic photoelastic material may be used within the spirit and scope of the present invention. For example, the photoelastic material may be fused quartz or any of a number of glasses or transparent plastic, such as acrylic plastic, or even water. The photoelastic material should preferably have a large photoelastic coefficient in order to produce strong scattering with a minimum of acoustic power from the transducer 5. Further, the photoelastic material should be substantially transparent to the incident light beam so as not to absorb any appreciable amount of light energy. For example, if the incident light beam is in the infrared portion of the spectrum such as, for example, the output of a carbon dioxide laser, tellurium or gallium arsenide might be used as the photoelastic material.

An ultrasonic transducer 5 is mounted on end 6 of the photoelastic block 4 for generating a beam of ultrasonic waves within the photoelastic block 4. The ultrasonic transducer 5 is preferably a piezo-electric crystal or thin film sandwiched between two electrodes to which are supplied the appropriate radio frequency (r.f.) drive signal. Various suitable piezoelectric materials are well-known to those skilled in the art such as, for example, crystalline quartz, lithium niobate, lead-zirconate-titanate (PZT) and zinc oxide.

When an appropriate radio frequency signal, preferably a sinusoid having a frequency in the range of 40 to 100 megahertz, is applied to the transducer 5, a beam of acoustic waves is propagated within the photoelastic block 4 from end 6 toward end 7. End 7 of photoelastic block 4 may be cut at an angle incommensurate with 360° and an acoustic absorber 7a, such as lead foil, may be bonded thereto in the conventional manner in order to prevent the acoustic waves from reflecting back through the block of photoelastic material 4. It will be appreciated, however, that the present invention contemplates the use of other acousto-optical devices, such as for example the resonant acousto-optical Q-switch described in the patent application of Daly, Kaplan and Cohen application Ser. No. 226,884 filed Feb. 16, 1972 and assigned to the assignee of the present invention.

In order to improve the overall Bragg effect scattering efficiency of the Q-switch, a quarter-wave plate 8 is mounted between the photoelastic block 4 and the high-reflectivity mirror 2. The fast axis 11 and slow axis 12 of quarter-wave plate 8 are oriented at +45° and −45° respectively to the direction of propagation of the ultrasonic beam. After passing through the photoelastic block 4, the light from laser rod 1 passes through quarter-wave plate 8, is reflected from mirror 2 and passes back through quarter-wave plate 8 before reentering the photoelastic block 4.

The effect is the same as if the light had passed through a single half-wave plate before reentering the photo-elastic block 4. Both the high-loss and low-loss polarizations are rotated by 90° so that on the return trip through the photo-elastic block 4, the high- and low-loss polarizations are reversed, allowing the Q-switch to operate with high efficiency on the larger fraction of light remaining in what had been the low-loss polarization. The result is that light of both polarizations are subjected to equal optical losses, and, in the case of fused quartz in which light polarized perpendicular to the direction of propagation of the ultrasonic beam is subjected to a five times greater optical loss than light polarized parallel to the ultrasonic beam direction, the overall optical loss is three times the optical loss achieved in a conventional acousto-optical Q-switch which would have caused the laser to oscillate in the low-loss polarization and avoid the high-loss polarization.

Since a 90° polarization rotation would adversely affect the laser oscillation when the ultrasonic beam is not present, a second quarter-wave plate 14 is inserted between the laser rod 1 and the photoelastic block 4 in order to nullify the effect of the quarter-wave plate 8 as seen from the laser rod 1. The fast axis 15 and slow axis 16 of quarter-wave plate 14 are aligned with slow axis 12 and fast axis 11, respectively, of quarter-wave plate 8. Thus, from the point of view of the laser rod 1, the effects of the two quarter-wave plates 8 and 14 cancel each other out thus leaving the laser oscillation unperturbed when the ultrasonic beam is not present.

Quarter-wave plates 8 and 14 may be of a type well-known to those skilled in the art. For example, quarter-wave plates and half-wave plates are discussed in Jenkins and White "Fundamentals of Optics", Chapter 27, Section 27.2. Such quarter-wave plates may be made of thin sheets of split mica or crystalline quartz cut parallel to the optical axis. The thickness of the quarter-wave plates is adjusted so as to introduce a 90° phase lag in the light polarized parallel to the slow axis relative to the light polarized parallel to the fast axis.

In the preferred form of the present invention, the quarter-wave plates 8 and 14 are crystalline quartz plates optically contacted to the sides of the photoelastic block 4. In addition, the edges of the quarter-wave plates 8 and 14 are firmly cemented to the photoelastic block 4 by an epoxy cement for example, in order to prevent separation of the assembly due to thermal stresses. It will be appreciated, however, that the quarter-wave plates 8 and 14 need not be optically contacted to the photoelastic block 4 but may simply be mechanically mounted in the appropriate positions within the laser cavity by conventional mechanical means.

It will also be appreciated that, although the preferred form of the present invention uses two quarter-wave plates 8 and 14 disposed or opposite sides of the photoelastic block 4, a single quarter-wave plate is all that is necessary to effect a 90° rotation of the polarization of the laser beam and thus take advantage of the high loss polarization of the Q-switch for more efficient scattering. A single quarter-wave plate is useful in situations where the 90° polarization rotation does not effect laser performance when the ultrasonic beam is turned off, or where the effect on laser performance is not significant to the user.

The improvement, $G$, in efficiency of the Q-switch resulting from the practice of the present invention may be calculated as follows, assuming the scattering of the perpendicular polarization is stronger:

$$G = lu/lp = 1 - [\cos^2(\eta_{\parallel})^{1/2} \cdot \cos^2(\eta_{\perp})^{1/2}]/1 - \cos^4(\eta_{\parallel})^{1/2}$$

Where $lu$ is the total round trip loss experienced by an unpolarized laser and $lp$ is the total round trip loss experienced by a laser having a polarization dependent Q-switch without quarter-wave plates, and $$\eta_{\parallel,\perp} \ [=(5/\lambda 2) \ P_u \ (L/H)(n^6/\rho V^3)(p_{\parallel,\perp})]^2$$

Here $\lambda$ is the optical wavelength, $P_u$ is the ultrasonic power, $L$ is the transducer length, $H$ is the transducer height, $n$ is the optical index of refraction, $p$ is the density of the photoelastic material, $V$ is the sound velocity, $p_{\parallel}$ is the photoelastic constant for light polarized parallel to the direction of propagation of the ultrasonic beam and $p_{\perp}$ is the photoelastic constant for light polarized perpendicular to the direction of propagation of the ultrasonic beam.

When $\eta$ is small compared to 1, then $$G = \eta_{\perp} + \eta_{\parallel} / 2\eta_{\parallel} = 1/2 \ [1+(p_{\perp}/p_{\parallel})^2]$$

For fused quartz $(p_{\perp}/p_{\parallel})^2 = 5$ so the improvement, $G$, in Q-switch efficiency is Q-switch efficiency 3. Tables of photoelastic constants can be found in "Elastic, Piezoelectric, Peizooptic and Electrooptic Constants of Crystals" edited by Hellweg, Vol. I in Group III of the Landolt-Bornstein series published by Springer-Verlag, New York. Such tables can be used by one skilled in the art to find other Q-switch materials suitable for use in the present invention.

While the principles of the present invention have been illustrated by reference to a preferred embodiment of our improved acousto-optical Q-switch, it will be appreciated by those skilled in the art that various modifications and adaptations may be made without departing from the spirit and scope of the present invention as defined with particularity in the appended claims.

What is claimed is:

1. An acousto-optical Q-switch for use in a laser oscillator including a laser medium for emitting an unpolarized or multiply polarized light beam, a high-reflectivity mirror, and a transmission mirror disposed so as to form a resonant cavity for said light beam, said acousto-optical Q-switch comprising:

a body of photoelastic material disposed in said resonant cavity between said high-reflectivity mirror and said laser medium, said body of photoelastic material being optically isotropic and transparent to the wavelength of said light beam;

means for intermittently generating a beam of ultrasonic waves in said body of photoelastic material so as to cause Bragg-effect scattering of said light beam, the strength of said Bragg-effect scattering being dependent upon the direction of polarization of said light beam in relation to the direction of propagation of said beam of ultrasonic waves;

a first quarter-wave plate disposed between said body of photoelastic material and said high-reflectivity mirror, said quarter-wave plate having fast and slow axes oriented at 45° angles to the direction of propagation of said beam of ultrasonic waves whereby the polarization of the light beam emerging from said block of photoelastic material is rotated 90° before reentering said block of photoelastic material so that light of the polarization that was less strongly scattered during one passage through said block of photoelastic material is more strongly scattered on the return passage through said block of photoelastic material.

2. The acousto-optical Q-switch of claim 1 further comprising:

a second quarter-wave plate disposed between said block of photoelastic material and said laser medium, said second quarter-wave plate having its fast and slow axes aligned with the slow and fast axes respectively of said first quarter-wave plate whereby the effect of said first quarter-wave plate is nullified when said beam of ultrasonic waves is turned off.

3. The acousto-optical Q-switch of claim 2 wherein said body of photoelastic material is made of fused quartz.

4. The acousto-optical Q-switch of claim 2 wherein said first and second quarter-wave plates are made of crystalline quartz.

5. The acousto-optical Q-switch of claim 2 wherein said first and second quarter-wave plates are optically contacted to said body of photoelastic material.

6. The acousto-optical Q-switch of claim 5 wherein the peripheries of said first and second quarter-wave plates are cemented to said body of photoelastic material.

7. The acousto-optical Q-switch of claim 1 wherein said laser medium is a solid state laser medium.

8. The acousto-optical Q-switch of claim 7 wherein said solid state laser medium is Neodynium-doped Yttrium Aluminum Garnet.

* * * * *